June 6, 1967  L. J. RAVER  3,324,383
DYNAMOELECTRIC MACHINE
Original Filed Sept. 28, 1961  7 Sheets-Sheet 1

INVENTOR.
Louis J. Raver
BY
C. R. Meland
HIS ATTORNEY

June 6, 1967 L. J. RAVER 3,324,383
DYNAMOELECTRIC MACHINE
Original Filed Sept. 28, 1961 7 Sheets-Sheet 2

INVENTOR.
Louis J. Raver
BY
C. R. Meland
HIS ATTORNEY

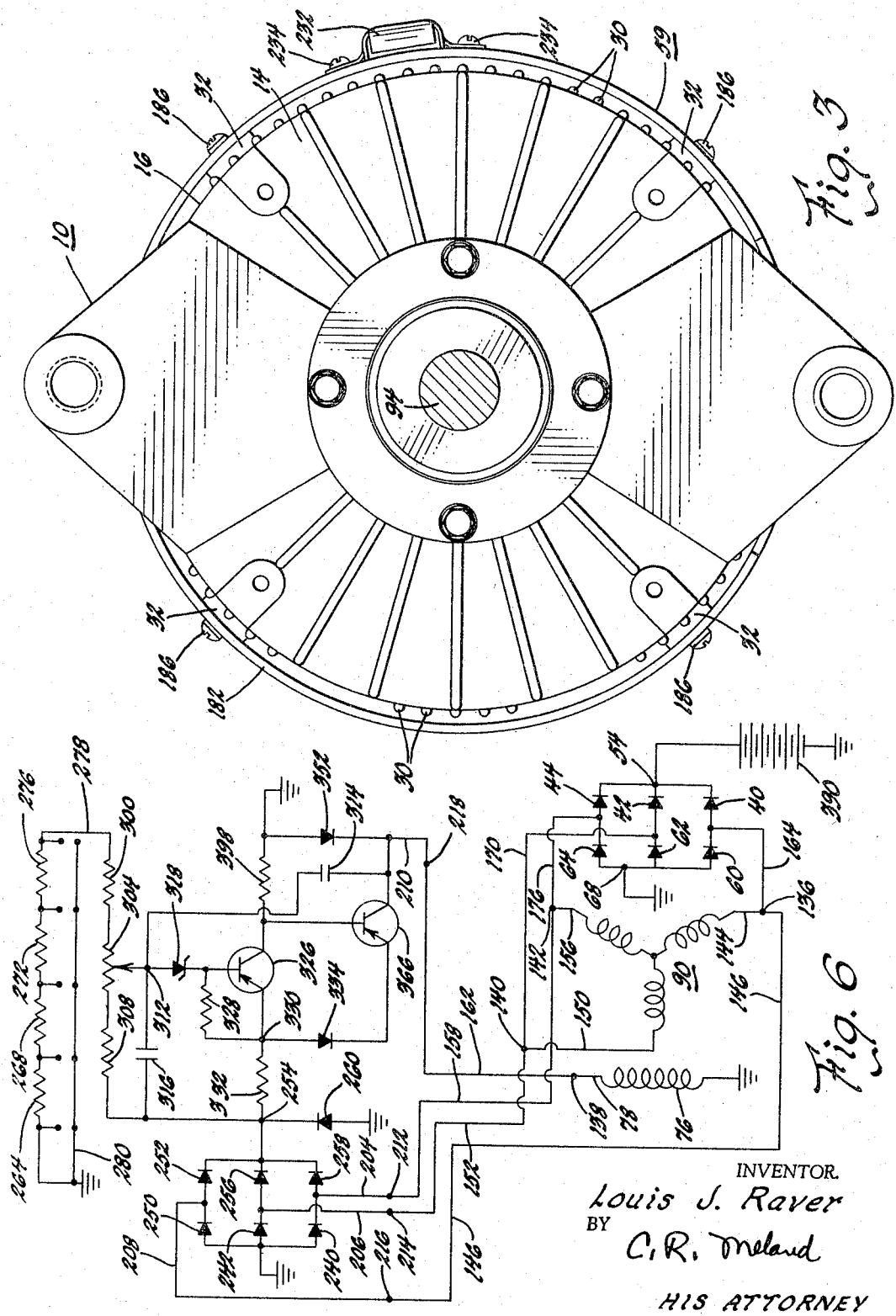

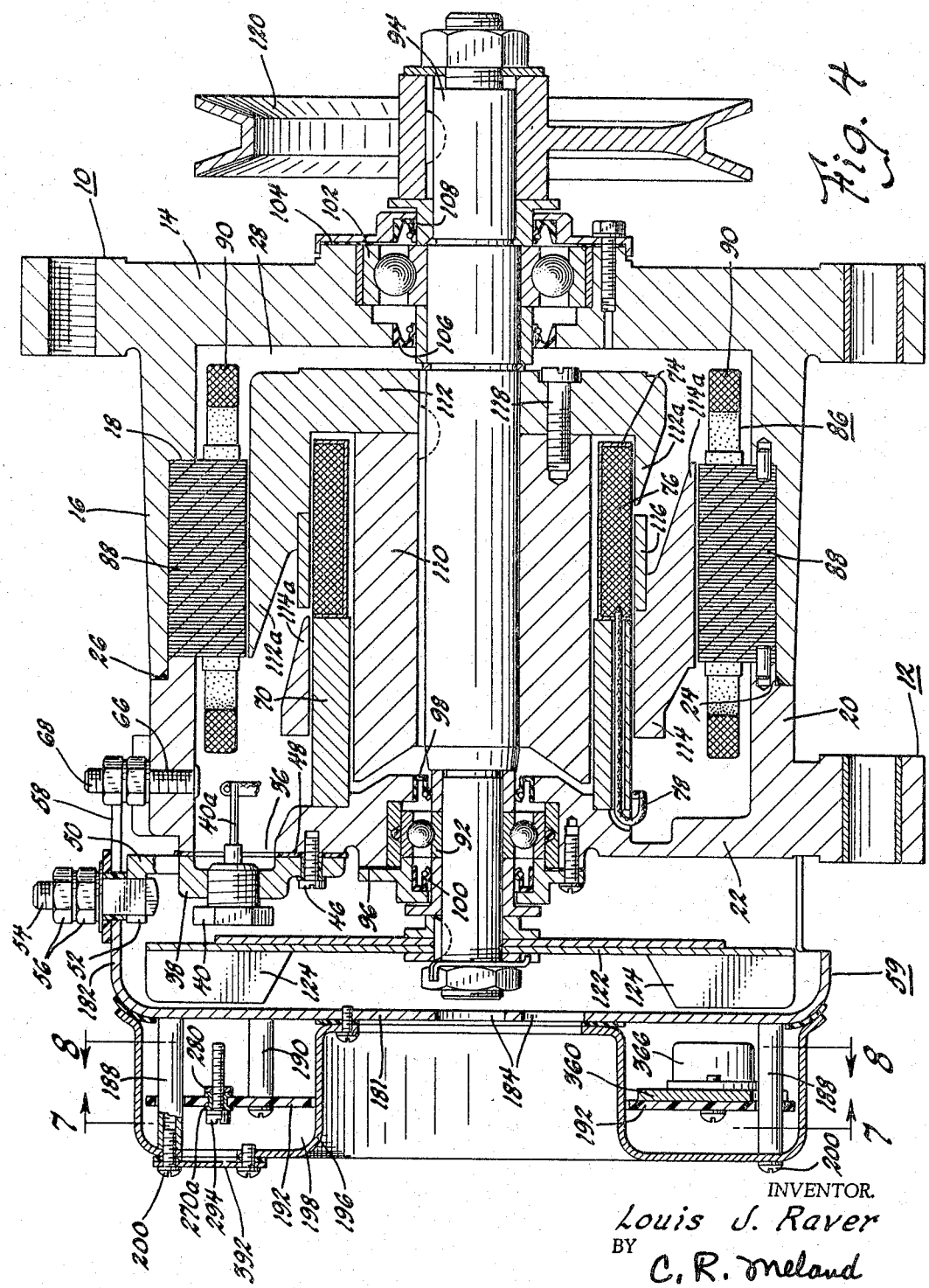

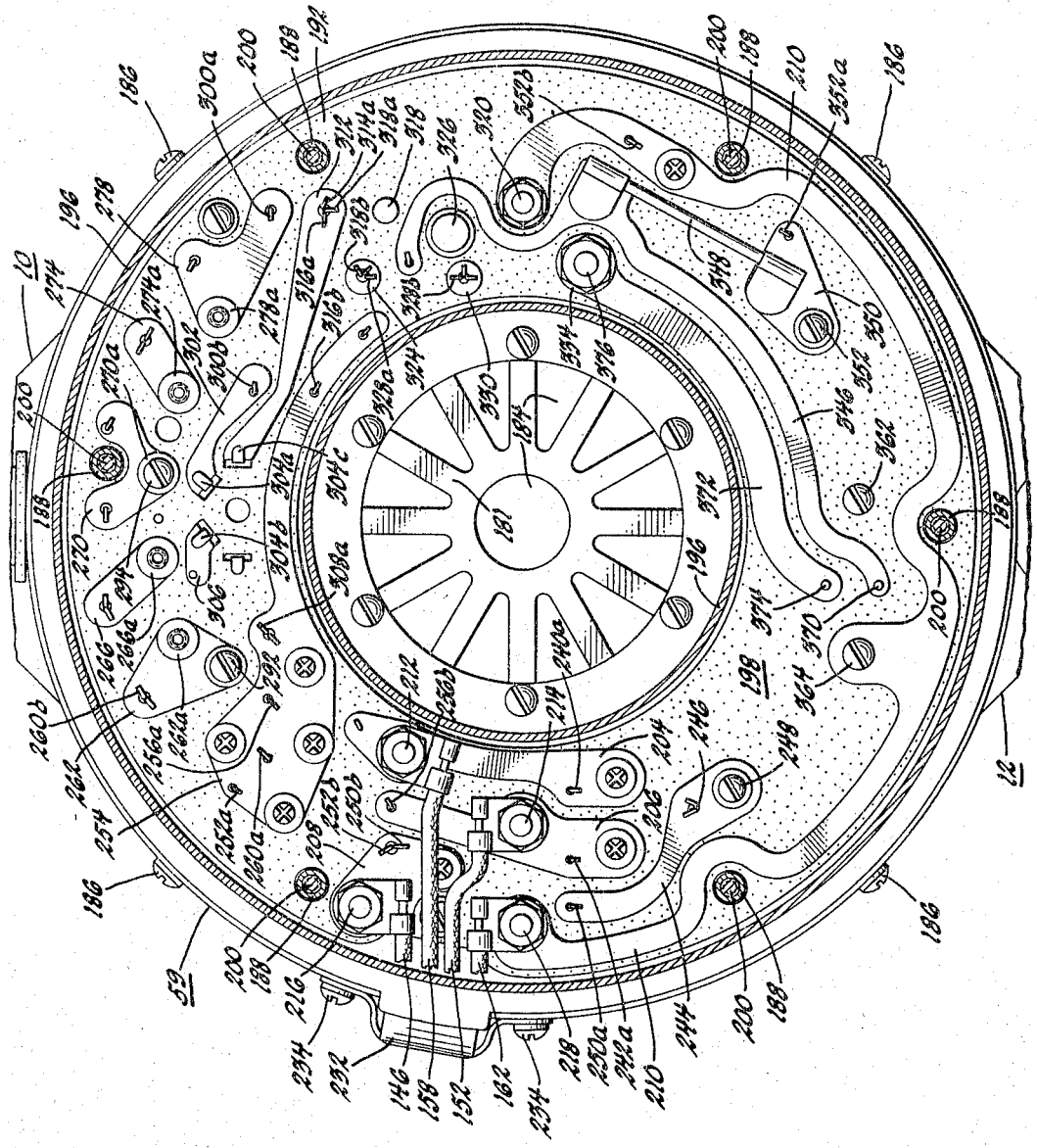

June 6, 1967  L. J. RAVER  3,324,383
DYNAMOELECTRIC MACHINE
Original Filed Sept. 28, 1961  7 Sheets-Sheet 7
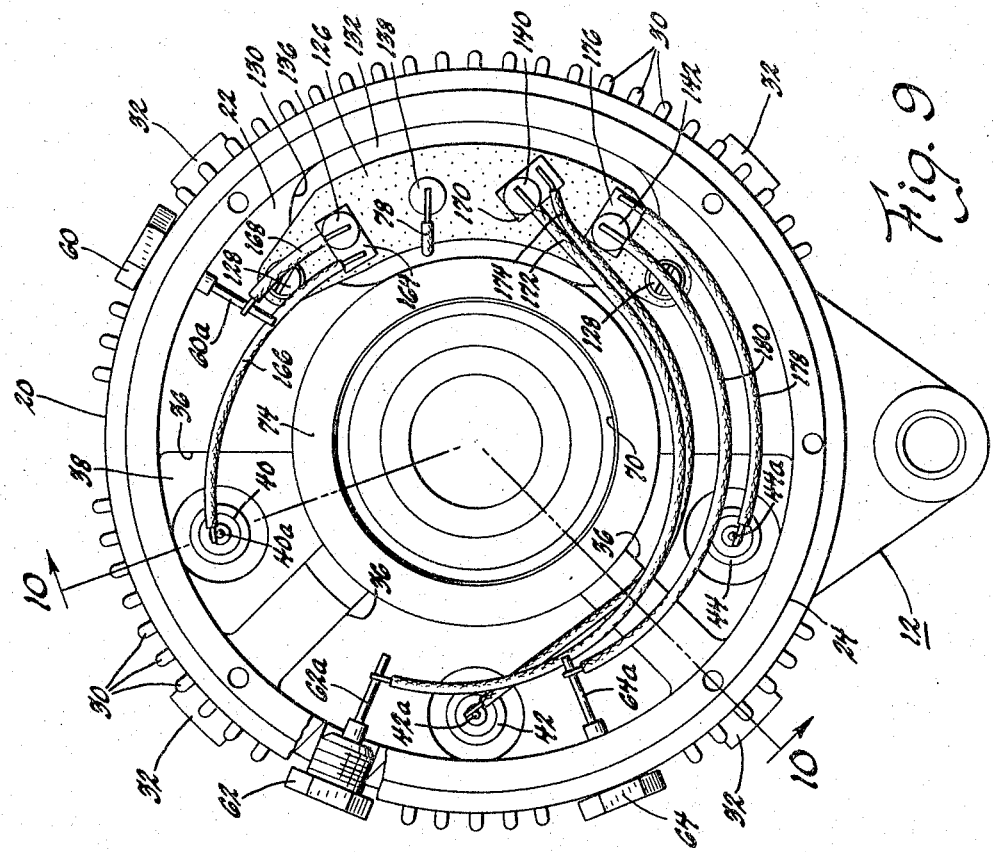
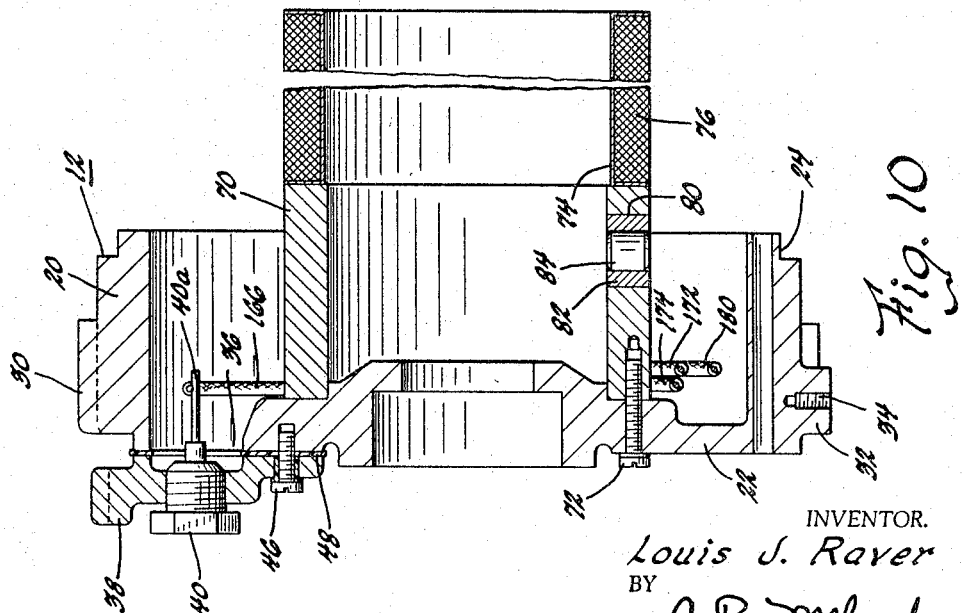
INVENTOR.
Louis J. Raver
BY
C. R. Meland
HIS ATTORNEY United States Patent Office 3,324,383
Patented June 6, 1967

3,324,383
DYNAMOELECTRIC MACHINE
Louis J. Raver, Anderson, Ind., assignor to General Motors Corporation, Detroit, Mich., a corporation of Delaware
Original application Sept. 28, 1961, Ser. No. 141,448, now Patent No. 3,271,601, dated Sept. 6, 1966. Divided and this application Dec. 13, 1965, Ser. No. 525,276
2 Claims. (Cl. 322—73)

This invention relates to a dynamoelectric machine that has an alternating current winding, built-in diodes for rectifying the A.C. output of the winding to direct current and a built-in voltage regulator for regulating the output of the machine. This application is a division of application Ser. No. 141,448, filed Sept. 28, 1961, now Patent No. 3,271,601.

In power supply systems for motor vehicles, it has been common practice to supply the various elements that make up the motor vehicle power supply system to the motor vehicle manufacturer and these various parts are secured in position and wired together by the motor vehicle manufacturer.

In contrast to the above noted common practice of wiring up several elements to make a power system, it is an object of this invention to provide a single unit generator which has both a built-in regulator and built-in diodes for providing a direct current output. With this arrangement, it is only necessary to mount the power unit in place on the motor vehicle, connect it with the driving means and connect the output terminals of the unit to the load terminals of the vehicle to put the unit into operation.

Another object of this invention is to provide a generator with a built-in transistor voltage regulator.

Still another object of this invention is to provide a power unit that is comprised of an enclosed generator having an enclosed built-in transistor voltage regulator. This object is of particular importance where the vehicle operates in a dusty atmosphere such as on earth moving equipment.

A further object of this invention is to provide a power unit that is comprised of a generator having a regulator which is supported by the fan shroud of the generator.

Another object of this invention is to provide a brushless alternating current generator that comprises a field winding and a fixed stator together with a rotor that rotates between the field winding and stator, the arrangement being such that the core of the field winding rotates with the rotor but wherein the field winding remains stationary.

A further object of this invention is to provide an electric power system for motor vehicles and the like that includes an alternating current generator and a transistor regulator, the AC output of the generator being rectified to direct current by a first bridge rectifier which feeds the D.C. loads of the vehicle, there being a second bridge rectifier connected with the AC output of the generator which feeds direct current to the transistor regulator and also supplies field power to the field coil of the generator through the regulator.

Further objects and advantages of the present invention will be apparent from the following description, reference being had to the accompanying drawings, wherein a preferred embodiment of the present invention is clearly shown.

In the drawings:

FIGURE 3 is a sectional view taken along lines 3—3 of FIGURE 2 and illustrating the opposite end of the dynamoelectric machine from that shown in FIGURE 1.

FIGURE 4 is a sectional view taken along line 4—4 of FIGURE 1.

FIGURE 5 is an enlarged sectional view taken along line 5—5 of FIGURE 1.

FIGURE 6 is a schematic electric circuit diagram of a power unit made in accordance with this invention.

FIGURE 7 is a sectional view taken along line 7—7 of FIGURE 4.

FIGURE 9 is an end view of a subassembly which forms a part of the power unit illustrated in FIGURE 4.

FIGURE 10 is a sectional view taken along line 10—10 of FIGURE 9.

Figure 1:
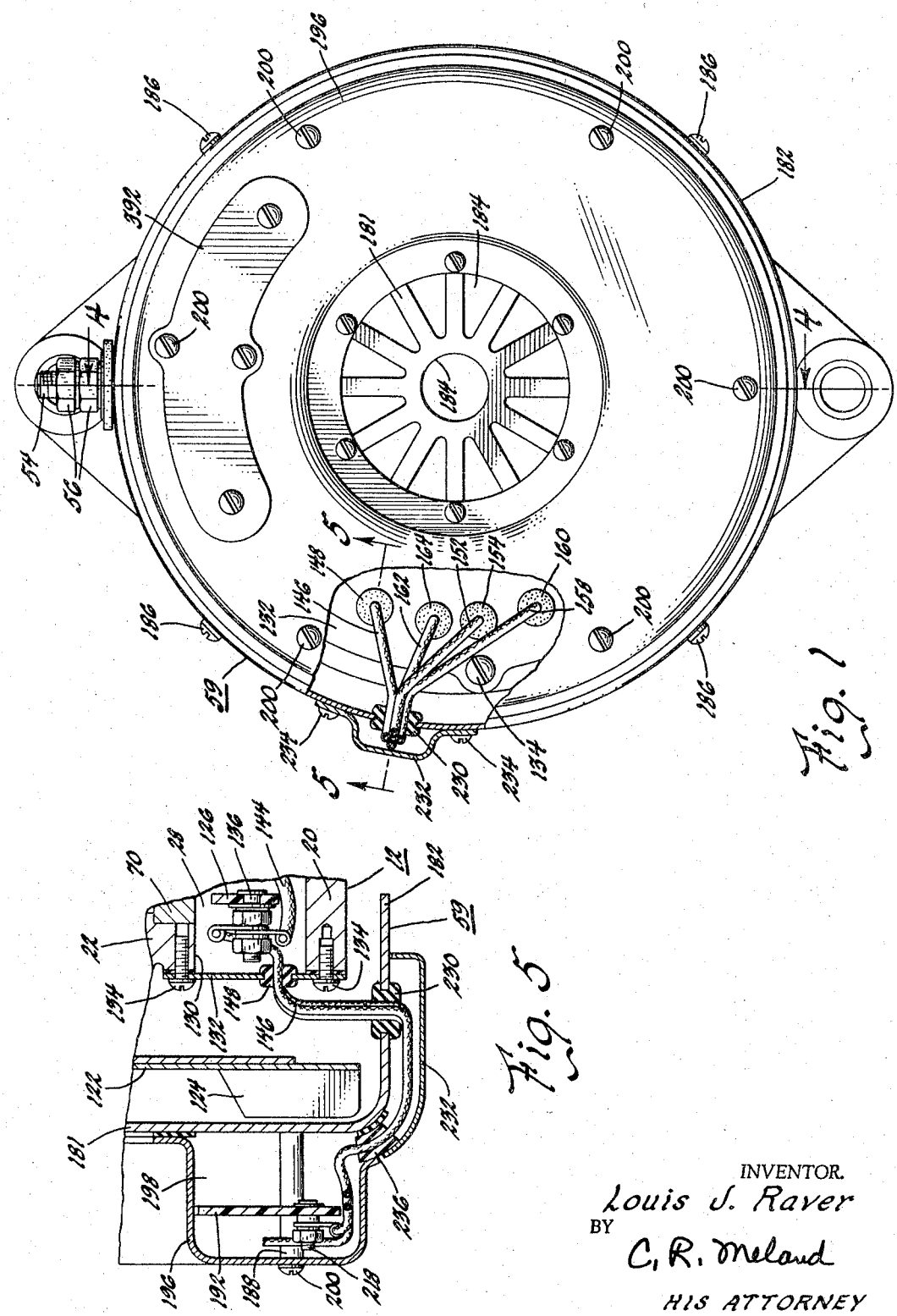
FIGURE 1 is an end view of a dynamoelectric machine made in accordance with this invention and looking in the direction of the arrow designated by reference numeral 1 in FIGURE 2.

Referring now to the drawings and more particularly to FIGURE 4, the power unit of this invention comprises an end frame generally designated by reference numeral 10 and a second end frame assembly generally designated by reference numeral 12. The end frame assemblies 10 and 12 are held together by suitable bolts not illustrated and it is seen that the end frame 10 has an end wall 14 and an annular wall 16. The end frame 10 may be formed of a suitable metal material such as die cast aluminum and it is seen that the annular wall 16 has an annular recess 18.

The end frame assembly 12 comprises a frame member having an annular wall 20 and an end wall 22. This end frame is likewise formed of metal material and may be formed of die cast aluminum. It is seen that the annular wall 20 has an annular recess 24 which receives an end of the annular wall 16 of end frame 10. An O-ring seal 26 is compressed between the walls 16 and 20. The end wall 14 is imperforate except for a bearing opening and end wall 22 is also imperforate except for certain covered openings and when the end frames are secured together a sealed chamber 28 is provided which encloses the elements of the generator. The generator thus may be referred to as a totally enclosed generator as the chamber 28 is completely enclosed so that dust, dirt and the like cannot enter this chamber. The end frame assembly 12 is better illustrated in FIGURES 9 and 10 and it is seen that the annular wall 20 is provided with radially extending ribs 30 and the radially extending bosses 32. The radially extending bosses 32 have tapped holes 34 and are used to secure a fan shroud in place as will become more readily apparent hereinafter.

The end wall 22 of end frame 12 has an annular opening 36 which is closed by a metal heat sink block 38. The heat sink block 38 is formed of a good heat conducting material such as die cast aluminum and has three threaded openings which receive the diodes 40, 42 and 44. The diodes 40, 42 and 44 are of the pn junction semiconductor type and preferably of the silicon type. Each of the diodes has an outer metal case formed with threads that match the threaded openings in the heat sink 38. The diodes each have a hexagonal head and the diode 40 has a relatively stiff self-supporting terminal 40a which projects into the chamber 28 as is clearly apparent from FIGURE 4. In a similar fashion, the diode 42 is provided with a relatively stiff metal terminal 42a and the diode 44 has the same type of terminal 44a. The rectifying junction for the diodes 40 through 44 has one side thereof connected with the metal case of the diodes and the other side connected with the projecting terminals.

The heat sink 38 is secured to the end wall 12 by a plurality of fasteners 46 which are electrically insulated from the heat sink 38. The heat sink member 38 is electrically insulated from the end wall 22 by an insulating gasket 48. It is seen that the heat sink member 38 has an integral section 50 formed with a slot 52 which receives the head of a terminal stud 54. The terminal stud 54 has a threaded section receiving the nuts 56 and this terminal stud passes through a slot 58 formed in a fan shroud which is generally designated by reference numeral 59. The terminal stud 54 is electrically insulated from the metal fan shroud 59 but is electrically connected with the section 50 of the heat sink 38. It therefore is seen that the terminal stud 54 will be at the same electrical potential as one side of the diodes 40 through 44 and this terminal stud 54 therefore is one DC output terminal of the power unit.

The annular wall 20 as is better illustrated in FIGURES 9 and 10 has threaded openings which respectively receive the diodes 60, 62 and 64. It can be seen that the diode openings extend radially of the annular wall 20 and that the diodes have relatively stiff terminals 60a, 62a and 64a. The diodes 60, 62 and 64 are the same as the diodes 40, 42 and 44 in that they have outer metal cases formed with threads and have projecting terminals. The rectifying junction within the diodes 60, 62 and 64 is reversed, however, from the rectifying junction within diodes 40, 42 and 44 so that the annular portion 20 will be at a different electrical potential than the heat sink 38. The annular section 20 is provided with a threaded opening 66 which receives the terminal stud 68. The terminal stud 68 is threaded and carries a pair of nuts. The terminal stud 68 will be at the same electrical potential as the annular section 20 of the end frame 12 and will be at the same electrical potential as the case side of the diodes 60, 62 and 64. It thus is seen that direct current can be taken across the terminal studs 54 and 68 with the terminal stud 68 being the grounded terminal.

The end wall 22 of the end frame assembly 12 carries a field coil assembly which includes the tubular member 70 which is formed of a magnetic material such as steel. The tubular member 70 is held to the end wall 22 by one or more fasteners 72 which are threaded into threaded openings in the member 70. The member 70 carries a metal coil form 74 which is welded or otherwise secured thereto and this coil form supports a field winding 76 made up of a plurality of turns of wire. One side of the field winding 76 is connected with the conductor 78 and this conductor as can be seen from FIGURE 4 passes through an opening formed in the member 70. The field coil 76 is insulated from the metal coil form 74 by a sheet of thin insulating material which is not illustrated. One side of this field coil however is connected with the metal coil form 74 and this may be accomplished by leaving a part of the coil form 74 uncovered by insulation when beginning the winding of the field coil 76 and winding some of the field coil wires directly against the coil form 74. This length of wire must, of course, have its insulation stripped off so that one side of the coil winding 76 will be connected with the metal coil form 74. The field coil 76 is thus electrically connected between the lead wire 78 and the metal coil form 74. The metal coil form 74 of course is at ground potential and is at the same potential as the terminal stud 68.

It can be seen from FIGURE 10 that the tubular member 70 is provided with a radially extending opening 80 which receives a sleeve member 82 which is formed of a nonmagnetic material such as brass. Fitted within the sleeve member 82 is a permanent magnet 84 which serves to initially magnetize the magnetic circuit of the generator as the generator is building up.

Referring now more particularly to FIGURE 4, it is seen that the power unit of this invention has a stator assembly which is generally designated by reference numeral 86. This stator assembly includes the laminated stator iron 88 which fits within the annular recess 18 of the annular wall 16 and which is clamped between the annular walls 16 and 20. The stator laminations 18 carry a three phase Y-connected stator winding 90 which is wound in slots in the stator iron 88.

The end wall 22 of the end frame assembly 12 is provided with an opening which receives a ball bearing assembly 92. The inner race of the ball bearing of this assembly is fixed to a shaft 94 and it is seen that the ball bearing assembly is sealed by means of a seal 96. In addition, oil seals 98 and 100 are provided to maintain the balls of the ball bearing assembly lubricated. The sealing, of course, maintains the chamber 28 sealed so that dirt and the like cannot enter this chamber.

The end wall 14 is likewise provided with a ball bearing assembly which is generally designated by reference numeral 102. The inner race of the ball bearing of this assembly is fitted to the shaft 94 and it is seen that this ball bearing assembly is sealed by means of the seals 104, 106 and 108. The seals of the ball bearing assembly 102 thus also serve to maintain the chamber 28 sealed from dust and other materials that would be detrimental to the working parts of the generator.

Fitted on the shaft 94 is an annular core member 110 which is formed of a magnetic material such as steel. The core member 110 serves as a core for the field winding 76 and also extends coextensively with the annular member 70.

The shaft 94 carries a pole member 112 which has axially projecting circumferentially spaced fingers 112a. A second pole member 114 is provided which has axially extending circumferentially spaced fingers 114a that interleave with the fingers 112a of the pole member 112. The pole member 114 is secured to the pole member 112 by means of an annular member 116. The annular member 116 is formed of a non-magnetic material such as cast manganese bronze and is brazed to the pole members 112 and 114. It thus is seen that the pole members 112 and 114 will rotate with the shaft 94 as will the annular magnetic member 110. It is seen that the annular magnetic member 110 is secured to the pole member 112 by one or more fasteners 118.

It will be appreciated by those skilled in the art that when the field coil winding 76 is fed with direct current an alternating current will be developed in the stator winding 90 as the pole members 112 and 114 rotate between the field winding 76 and the stator assembly 86. The pole members 112 and 114 and, the annular magnetic member 110 and the shaft 94 actually make up a rotor assembly. It is seen that the shaft 94 is connected with a pulley 120 which may be belt driven and that this shaft also is connected with a fan 122 having blades 124. When the pulley 120 is driven and the field winding 76 is supplied with direct current, an alternating current is generated in the three phase Y-connected stator winding 90.

Referring now more particularly to FIGURES 1, 5 and 9, it is seen that the end wall 22 of end frame assembly 12 carries a terminal board 126 which is formed of insulating material. The terminal board 126 is secured to the end wall 22 by fasteners 128 and is positioned in alignment with an opening 130 formed in the end wall 22. This opening 130 is closed by a cover plate 132 which is fixed to the end wall 22 by the fasteners 134.

The terminal plate 126 carries terminals 136, 138, 140 and 142. The terminals 136 through 142 are substantially identical and one of the terminals 136 is shown in detail in the sectional view of FIGURE 5. This terminal like the other terminals has a head section that is riveted over and has a threaded shank section which receives nuts and terminals. The terminal stud 136 is connected with a lead wire 144 that comes from one of the phase windings of the stator winding 90. This terminal stud 136 as is best illustrated in FIGURE 5 is also connected with a lead wire 146 which passes through a grommet 148 fitted within an opening in the cover plate 132. In a similar fashion, the terminal stud 140 is connected with another phase winding of the stator winding 90 by a conductor 150. The terminal stud 140 is connected with a lead wire 152 which passes through the rubber grommet 154. The terminal stud 142 is connected with another phase winding of the stator winding 90 by the lead wire 156 and this terminal stud is connected with lead wire 158 that passes through the rubber grommet 160. The terminal 138 is connected with the lead wire 78 coming from one side of the field winding 76. The terminal 138 is also connected with a lead wire 162 which passes through the rubber grommet 164.

Referring now more particularly to FIGURE 9, it is seen that the terminal 136 carries a conductor member 164 and this conductor member is connected respectively with the terminals 40a and 60a of diodes 40 and 60 by means of lead wires 166 and 168. This connection serves to connect one of the phase windings of the stator winding 90 with the projecting terminal sides of the diodes 40 and 60. In a similar fashion, the terminal 140 is connected with a conductor member 170 and this conductor member is connected with the terminals 42a and 62a of diodes 42 and 62 via the lead wires 172 and 174. The terminal stud 142 is connected with a conductor member 176 and this conductor member is connected with the projecting terminals 44a and 64a of diodes 44 and 64 via lead wires 178 and 180. It can be seen from the foregoing that the physical arrangement of the power unit is such that the diodes 40, 42, 44, 60, 62 and 64 are connected in a three phase full wave bridge rectifier with the phase windings of the stator winding 90. It also can be seen that the output terminals of this bridge rectifier are the terminal 54 and the grounded terminal 68. This is depicted in the schematic circuit diagram of FIGURE 6.

Figure 2:
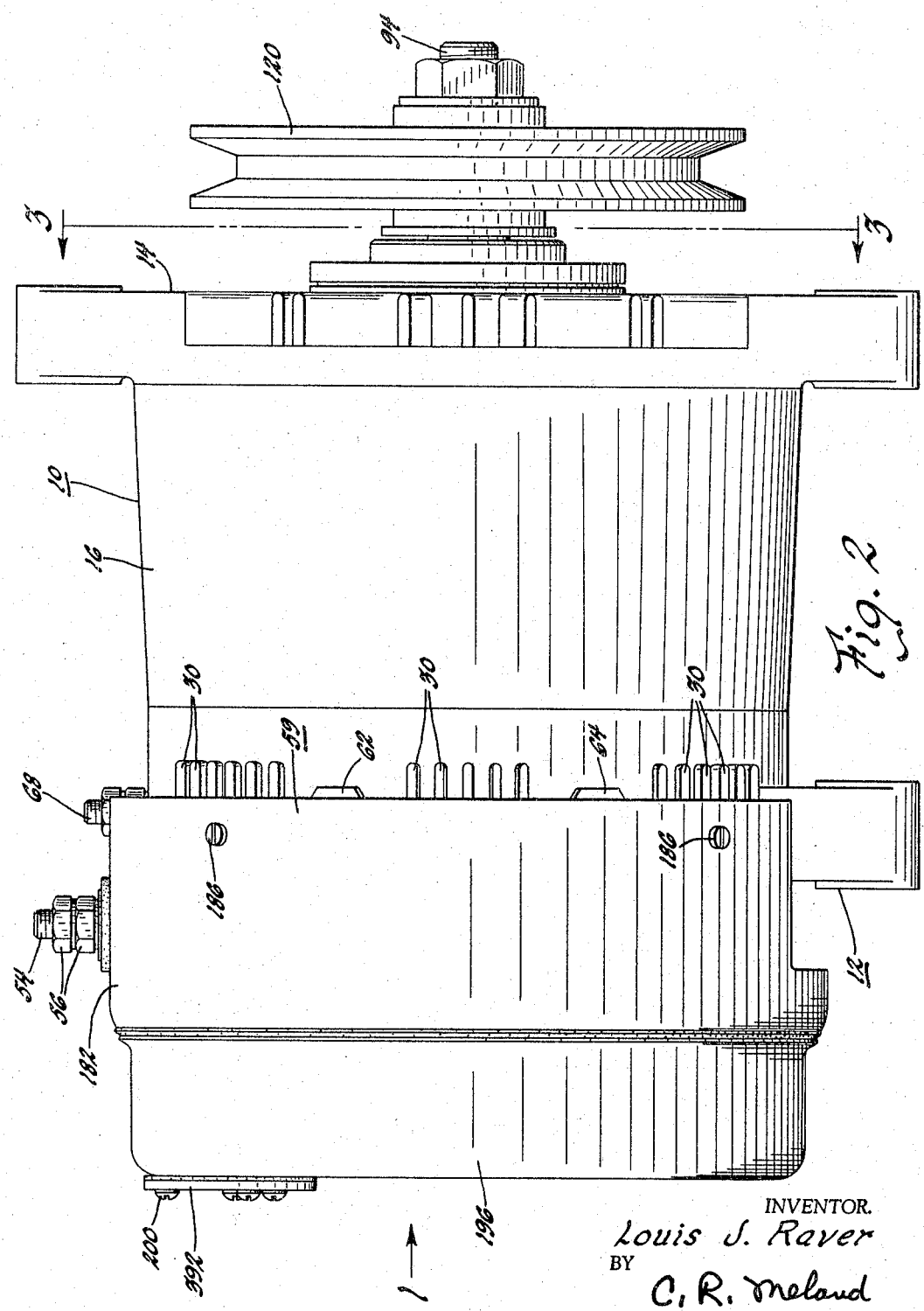
FIGURE 2 is a side plan view of the dynamoelectric machine illustrated in FIGURE 1.

Referring now more particularly to FIGURES 2 and 4, it is seen that the fan shroud 59 encircles the fan 122 and has an end wall 181 and an annular wall 182. The end wall 180 is formed with a plurality of air inlet openings 184 as can readily be seen from FIGURES 1 and 4. The annular section 182 of the fan shroud 59 engages the threaded bosses 32 and fasteners 186 are used to secure the fan shroud in place on the end frame assembly 12. These fasteners 186 fit within the threaded openings 34 formed within the bosses 32. It is pointed out that the annular section 182 of the fan shroud is spaced sufficiently from the periphery of the end frame assembly 12 to permit air to exit between the fan shroud and the annular section 20 of the end frame assembly 12. This air will exit over the heat radiating ribs 30 and will pass in contact with the heads of diodes 60, 62 and 64.

The end wall 181 of the fan shroud 59 carries a plurality of first metal tubular members 188 and a plurality of second metal tubular members 190 which are shorter than the metal tubular members 188. The tubular members 188 and 190 are welded to the end wall 181 or otherwise secured to this end wall. The tubular members 190 serve to support a printed circuit board 192 which is formed of suitable electric insulating material. This printed circuit board 192 is secured to the posts 190 by fasteners which pass through the printed circuit board and are threaded into the tubular supports or posts 190. The printed circuit board, as is described hereinafter, supports electrical components that form a transistor regulator.

The projecting posts 188 serve to support a cover member 196 which with the end wall 181 of the fan shroud 59 forms a sealed annular compartment 198 that houses the transistor regulator. The cover member 196 is secured to the posts 188 by the fasteners 200 which are threaded into the posts 188. It is seen that the cover member 196 is annular in configuration and generally cup-shaped. The fasteners 200 also serve to fix the cover plate 196 with respect to the end wall 181 of the fan shroud 59. It can be seen from FIGURE 4 that suitable gaskets are interposed between the cover plate 196 and the fan shroud 59 to form a completely sealed compartment for the transistor regulator.

Figure 8:
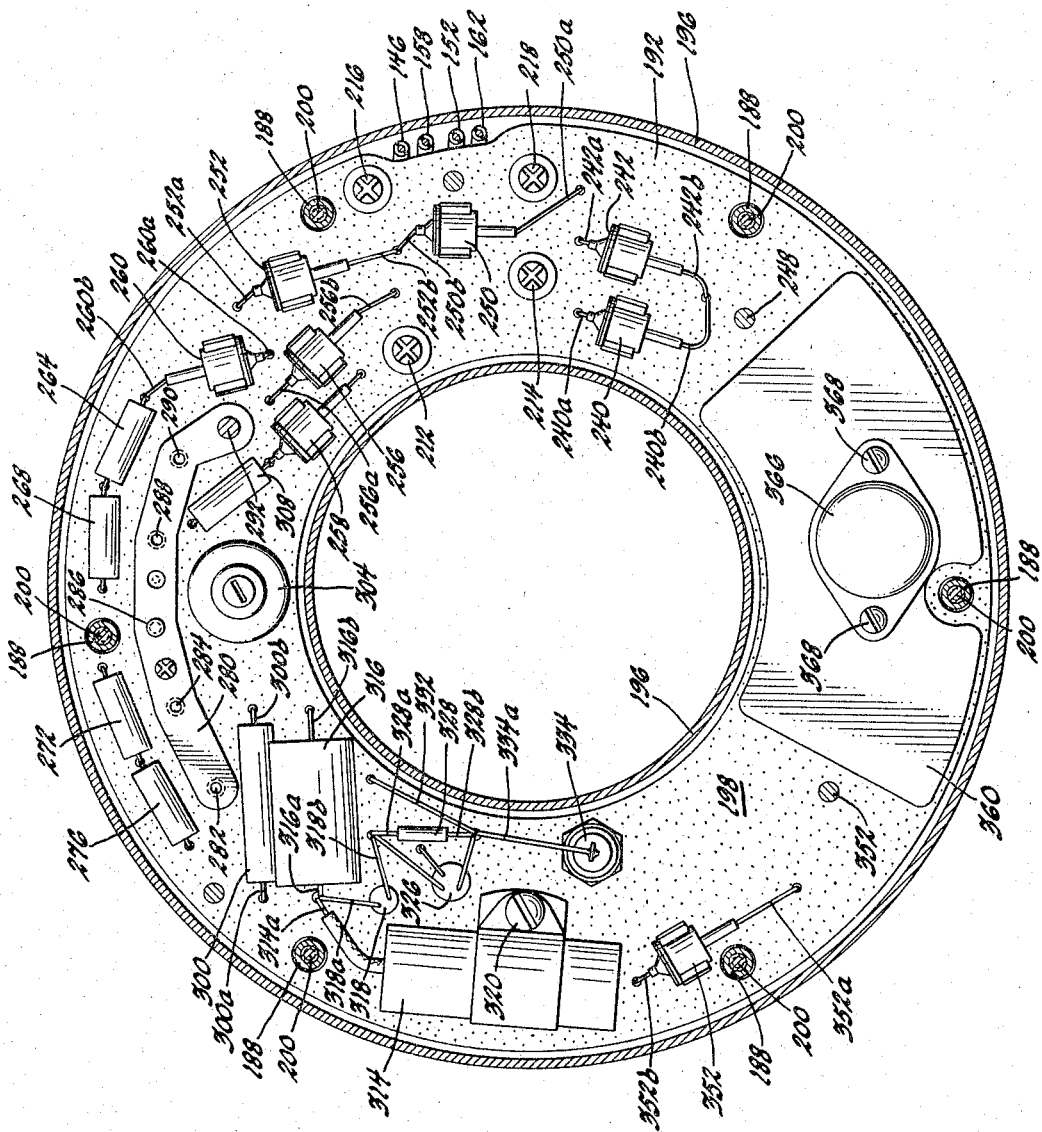
FIGURE 8 is a sectional view taken along line 8—8 of FIGURE 4.

Referring now more particularly to FIGURES 7 and 8, it can be seen that the printed circuit board 192 carries a plurality of electrical components and printed circuit conductors which are formed on the printed circuit board 192 in any well-known manner. In FIGURE 7, it is seen that the printed circuit board 192 carries printed circuit conductors 204, 206, 208 and 210. Passing through these printed circuit conductors and electrically connected therewith are the terminal studs 212, 214, 216 and 218. The heads of these terminal studs are riveted over, as is seen from FIGURE 8, and the studs have threaded sections which receive the nuts shown in FIGURE 7. The terminal stud 218 is connected with the lead wire 162 coming from the terminal plate 126 and thus is connected to one side of the field winding 76 of the dynamoelectric machine. The terminal stud 212 which is connected with printed circuit conductor 204 is connected with the lead wire 158. In a similar fashion, the terminal stud 214 is connected with lead wire 152 and the terminal stud 216 is connected with the lead wire 146. From an inspection of FIGURES 5 and 7, it is seen that as the lead wires 146, 162, 152 and 158 emerge from the cover plate 132 they then pass through a rubber grommet 230 fitted within an opening formed in the annular wall 182 of the fan shroud 60. The lead wires then pass through a cover member 232 which is secured to the fan shroud by the fasteners 234. The lead wires then pass through one or more gasket members 236 and then pass into the sealed chamber 198 where they are connected respectively with the terminals 212, 214, 216 and 218. The cover plate 232, of course, will protect the lead wires and it is seen that these lead wires connect parts contained within the chamber 198 and parts carried by the terminal plate 126 located in chamber 28, and in making these connections the parts are still maintained sealed from the atmosphere. It is also seen that by this connecting means, the printed circuit conductors 204, 206 and 208 are connected with the phase windings of the stator winding 90. The printed circuit conductor 210 is connected with the field winding 76 of the power unit.

Referring now more particularly to FIGURES 7 and 8, it is seen that the printed circuit board 192 supports a pair of diodes 240 and 242. The terminal 240a of diode 240 is connected with printed circuit conductor 204. This connection is made by passing the terminal 240a through openings in the printed circuit board and printed circuit conductor 204 and then soldering or otherwise securing this terminal to the printed circuit conductor 204. In a similar fashion, the terminal 242a of diode 242 is connected with the printed circuit conductor 206. The other terminals 240b and 242b pass through an opening in the printed circuit board 192 and are connected with a printed circuit conductor 244 at 246. The printed circuit conductor 244 is actually at ground potential due to the fact that it is connected with one of the metal posts 190 by a fastener 248 which also serves to hold the printed circuit board assembly in place. The printed circuit conductor 244 is connected with lead wire 250a of a diode 250. The other terminal lead 250b and a terminal lead 252b of diode 252 pass through the printed circuit board and are connected with the printed circuit conductor 208. The terminal 252a of diode 252 is connected with a printed circuit conductor 254.

Another diode 256 has one terminal connected with the printed circuit conductor 206 and has its opposite terminal 256a connected with the printed circuit conductor 254. Another diode 258 is provided and this diode is connected between printed circuit conductors 204 and 254. A diode 260 is provided which has one terminal side 260a passing through the printed circuit board and connected with the printed circuit conductor 254. Terminal 260b of the diode 260 is connected with the printed circuit conductor 262. The printed circuit conductor 262 is also connected to the terminal lead wire of a resistor 264, the opposite side of this resistor being connected with the printed circuit conductor 266. A resistor 268 is provided and this resistor has terminal leads connected respectively with printed circuit conductors 266 and 270. Another resistor 272 has terminal leads connected between printed circuit conductor 270 and printed circuit conductor 274. Still another resistor 276 has terminal leads connected between circuit conductor 274 and printed circuit conductor 278.

The printed circuit conductors 262, 266, 270, 274 and 278 engage ferrule-like connectors 262a, 266a, 270a, 274a and 278a. The ferrule connector 270a is shown in FIGURE 4 of the drawings and it is seen that it passes through the printed circuit board 192. The other connectors 262a, 266a, 274a and 278a are like the ferrule connector 270a. Positioned in alignment with these ferrule connectors is a strap connector 280 which is formed of an electrically conductive material and which has threaded openings 282, 284, 286, 288 and 290 which line up respectively with the ferrule connectors 278a, 274a, 270a, 266a and 262a. The conductor strap 280 is secured to the printed circuit board 192 by rivets and also by a fastener 292 which is threaded into one of the tubular posts 190. This fastener 292 thus serves to connect the printed circuit conductor 262 to ground potential and also serves to connect the conductor strap 280 to ground potential.

A shorting screw 294 is provided which may be passed selectively through any of the ferrules 262a, 266a, 270a, 274a and 278a, and then threaded into one of the threaded openings in the conductor strap 280. This conductor screw 294 thus serves as a voltage adjustment means for adjusting the voltage setting of the transistor voltage regulator.

The printed circuit conductor 278 which is connected with one side of resistor 276 is also connected to one side of a resistor 300 by virtue of the terminal 300a which is connected with the printed circuit conductor 278. The opposite side of resistor 300 is connected with the printed circuit conductor 302 by virtue of its lead wire 300b. The printed circuit conductor 302 is connected to one terminal of a potentiometer resistor 304. This connection is made by terminal 304a of the potentiometer resistor. Another terminal 304b of the potentiometer resistor is connected with the printed circuit conductor 306. A resistor 308 has one terminal side connected with the printed circuit conductor 306 and has its other terminal side 308a connected with the printed circuit terminal 254. The third terminal 304c of the potentiometer resistor 304 is connected with a printed circuit conductor 312. It can be seen that the top end of the printed circuit conductor 312 is connected with lead wires. One of these lead wires is the conductor 314a of a capacitor 314. The other conductor connected with printed circuit conductor 312 is the conductor 316a coming from a capacitor 316. The third conductor is conductor 318a coming from a Zener diode 318. The opposite side of capacitor 314 is connected with printed circuit conductor 210 by means of an electrically conductive fastener 320 which also serves to fix the capacitor 314 in place on the printed circuit board. The side of capacitor 316 opposite to terminal side 316a is connected with printed circuit conductor 254 by its lead wire 316b. The other terminal 318b of Zener diode 318 is connected with a printed circuit conductor 324.

The printed circuit conductor 324 is connected with the base electrode of a transistor 326. The printed circuit conductor 324 is also connected with the lead wire 328a of a resistor 328. The other lead wire 328b of resistor 328 is connected with the printed circuit conductor 330. The printed circuit conductor 330 is connected with the emitter electrode of transistor 326, with one side of a resistor 332 and with the lead wire 334a of the diode 334. The collector electrode of transistor 326 is connected with the printed circuit conductor 346. The printed circuit conductor 346 is connected to one side of a resistor 348, the opposite side of this resistor being connected with printed circuit conductor 350. The printed circuit conductor 350 is at ground potential by virtue of the fastener screw 352 which passes into one of the tubular posts 190 extending from the shroud 59.

The printed circuit conductor 350 is connected to the terminal lead wire 352a of a diode 352. The other terminal lead 352b of diode 352 is connected with the printed circuit conductor 210.

The printed circuit board 192 supports a metal heat sink member which is generally designated by reference numeral 360. The metal heat sink member 360 is held in place by fasteners 362 and 364 which are threaded into suitable openings formed in the heat sink member. The fastener 364 passes through the printed circuit conductor 210 and therefore serves to electrically connect the metal heat sink member 360 with the printed circuit conductor 210.

The metal heat sink member 360 supports a transistor 366 of the pnp type. The metal case of this transistor is the collector electrode and therefore it is seen that the collector electrode of the transistor is connected with the printed circuit conductor 210 via the heat sink member 360. The transistor 366 is held in place on the metal heat sink member by fasteners 368 which are threaded into suitable threaded openings in the heat sink member. The base electrode of transistor 366 is connected to printed circuit conductor 346 at 370. The emitter electrode of transistor 366 is connected with the printed circuit conductor 372 at point 374. The printed circuit conductor 372 is connected with the stud end 376 of the diode 334.

It is pointed out that all of the components of the transistor regulator are supported by the printed circuit board 192 which is disposed within the cover member 196 and in the chamber 198 formed by the cover member and the end wall 181 of the fan shroud. It is also seen from the foregoing description that the elements of the generator are enclosed in a sealed compartment 28 whereas the elements of the transistor regulator are enclosed in the sealed chamber 198 and that these two parts of the power unit are connected by the lead wires 162, 158, 152 and 146.

In FIGURE 6, it is seen that a battery 390 is connected between ground and the output terminal 54 of the power unit. It will be appreciated that other electrical loads on the motor vehicle can be energized between terminal 54 and ground. When the power unit of this invention is used on a motor vehicle, the engine drives the pulley 120 and initial buildup of the generator is caused by the permanent magnet 84. As the generator builds up, the bridge rectifier comprised of diodes 40, 42, 44, 60, 62 and 64 provides power for the electrical loads of the motor vehicle. The other bridge rectifier comprised of diodes 240, 242, 250, 252, 256 and 258 provides a DC output voltage which feeds the transistor voltage regulator and which also feeds the field winding 76 through the transistor voltage regulator.

The transistor voltage regulator operates to maintain the output voltage appearing across terminals 54 and 68 substantially constant. The regulator performs this function by switching the transistor 366 on and off between its emitter and the collector electrodes. The circuit for the field winding 76 may be traced from the junction 254, through resistor 332, through diode 334, through the emitter to collector circuit of transistor 366, then through lead wire 162 and then through the field winding 76 to ground. The conductivity of transistor 366 is controlled by transistor 326 and the conductivity of transistor 326 is controlled by the amount of voltage appearing between junction 254 and ground. The voltage sensing element is the Zener diode 318 which is connected between junction 312 and the base electrode of transistor 326. As the voltage appearing between junction 254 and ground increases, a set of switching actions is set into motion to reduce the field current through field winding 76. When the voltage between terminal 254 and ground decreases, an opposite effect is achieved in that field current is increased through the field winding 76. The output voltage can be adjusted by removing the cover 392 on the cover member 196 and then shifting the conducting screw 294 to its proper position in one of the ferrules.

It is seen from FIGURE 6, that the field winding 76 cannot be initially energized from the battery 390 in order to cause a build-up in generator output voltage. The permanent magnet performs this function and with the arrangement of FIGURE 6, a separate bridge rectifier comprised of the rectifiers 240, 242, 250, 252, 256 and 258 provides a sense voltage for the transistor voltage regulator and also supplies the field current to the field winding 76.

Referring now more particularly to FIGURE 4, it is seen that as the shaft 94 is driven, the fan 124 rotates. The fan 124 draws air into the power unit through the air inlet openings 184 and exhausts air through the space between the annular portion 182 of the shroud 59 and the end frame assembly 12. The air traversing this path performs very important cooling functions. First of all, it is seen that air traversing this path will be moved along the inner surface of the end wall 181 of the fan shroud 59. This flow of air thus serves to cool the transistor regulator which is mounted in the chamber 198. It is also seen that air traversing the above noted path will pass in contact with the heat sink 38 and with the heads of the diodes mounted in this heat sink. In addition, as the air is exhausted, the air must pass in contact with the annular wall 20 of the end frame assembly 12 and must also pass in contact with the heads of diodes 62, 64 and 60. It can be seen from the foregoing that although the generator portion of the power unit is completely sealed as well as the transistor regulator these elements are still sufficiently cooled by the arrangement of air cooling that has been provided. In addition, it is seen that the main power diodes are effectively cooled by the arrangement of this invention. It is also seen that with the power unit of this invention, a complete power system is provided in one package that may be mounted on any type of motor vehicle to provide direct current power for the loads of the motor vehicle.

It is pointed out in connection with FIGURE 6 that the diodes 240, 242 and 250 could be eliminated if desired since they are in parallel with the grounding diodes 60, 62 and 64 of the main power bridge rectifier. With such an arrangement, the ground return path for diodes 252, 256 and 258 is through diodes 60, 62 and 64 and there is a savings in cost of three diodes.

While the embodiments of the present invention as herein disclosed, constitute a preferred form, it is to be understood that other forms might be adopted.

What is claimed is as follows:

1. An electrical generating system comprising, an alternating current generator having a plurality of output circuits and a field winding, a first full wave rectifier circuit electrically interconnected with said alternator output circuits having a bank of diodes having positive polarity and a bank of diodes of negative polarity and respective direct current output circuit means across which an electrical load may be connected, a second full wave rectifier circuit having at least a bank of positively poled diodes connected to the junction of the positive and negative polarity diode banks of said first rectifier to cooperate with said negative polarity bank of diodes of said first rectifier circuit to provide a second rectifier circuit having a positive polarity output circuit peculiar thereto and a negative polarity output circuit common with said first rectifier circuit, a voltage regulator circuit including a switching transistor having at least emitter and collector electrodes and means for connecting said voltage regulator circuit and the series combination of said field winding and said emitter-collector electrodes of said switching transistor across said positive and negative polarity output circuits of said second rectifier circuit.

2. An electrical generating system comprising, an alternating current generator having a plurality of output circuits and a field winding, a first full wave rectifier circuit electrically interconnected with said alternator output circuits having a bank of diodes of positive polarity and a negative polarity and respective direct current output circuit means across which an electrical load may be connected, a second full wave rectifier circuit having at least a bank of positively poled diodes connected to the junction of the positive and negative polarity diode banks of said first rectifier to cooperate with said negative polarity bank of diodes of said first rectifier circuit to provide a second rectifier circuit having a positive polarity output circuit peculiar thereto and a negative polarity output circuit common with said first rectifier circuit, a voltage regulator circuit including a switching transistor having at least base, emitter and collector electrodes, mean for connecting the series combination of said field winding and said emitter-collector electrodes of said switching transistor across said positive and negative polarity output circuits of said second rectifier circuit and means connected with said base electrode of said switching transistor for controlling the conductance of said transistor in response to output voltage magnitude of said generator.

References Cited

UNITED STATES PATENTS

| | | | |
|---|---|---|---|
| 2,738,457 | 3/1956 | Gilchrist | 322—28 |
| 2,874,346 | 2/1959 | Orvis | 322—25 X |
| 3,009,091 | 11/1961 | Hallidy | 322—28 |
| 3,031,607 | 4/1962 | Rona | 322—25 |
| 3,173,074 | 3/1965 | Domann | 322—73 X |
| 3,185,916 | 5/1965 | Brewster | 322—73 X |

FOREIGN PATENTS 553,509  12/1956  Belgium.

MILTON O. HIRSHFIELD, *Primary Examiner.*

J. J. SWARTZ, *Assistant Examiner.*